United States Patent
Sengupta et al.

(10) Patent No.: US 7,349,355 B2
(45) Date of Patent: Mar. 25, 2008

(54) METHODS AND APPARATUS FOR PROVIDING A COMMUNICATION PROXY SYSTEM

(75) Inventors: Uttam K. Sengupta, Portland, OR (US); William N. Schilit, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 584 days.

(21) Appl. No.: 10/976,946

(22) Filed: Oct. 27, 2004

(65) Prior Publication Data

US 2006/0087993 A1    Apr. 27, 2006

(51) Int. Cl.
*G08C 17/00* (2006.01)
*H04B 1/38* (2006.01)
*H04B 1/16* (2006.01)

(52) U.S. Cl. .................... 370/311; 455/574; 455/343.2
(58) Field of Classification Search ................ 370/311; 455/574, 343.2, 522
See application file for complete search history.

(56) References Cited

U.S. PATENT DOCUMENTS

| | | | |
|---|---|---|---|
| 2003/0118015 A1* | 6/2003 | Gunnarsson et al. | 370/389 |
| 2004/0128310 A1* | 7/2004 | Zmudzinski et al. | 707/102 |
| 2007/0042814 A1* | 2/2007 | Kakimoto et al. | 455/574 |

FOREIGN PATENT DOCUMENTS

WO    WO 2005/020505 A    3/2005

OTHER PUBLICATIONS

James "Bo" Begole, et al., "Work Rhythms: Analyzing Visualizations of Awareness Histories of Distributed Groups", CSCW '02, Nov. 16-20, 2002, pp. 334-343.
PCT Search Report dated Mar. 13, 2006.

* cited by examiner

*Primary Examiner*—Barry Taylor
(74) *Attorney, Agent, or Firm*—Schwabe, Williamson & Wyatt, P.C.

(57) ABSTRACT

Embodiments of methods and apparatus to provide a communication proxy system are generally described herein. Other embodiments may be described and claimed.

25 Claims, 6 Drawing Sheets

METHODS AND APPARATUS FOR PROVIDING A COMMUNICATION PROXY SYSTEM

TECHNICAL FIELD

The present disclosure relates generally to wireless communication systems, and more particularly, to methods and apparatus for providing a communication proxy system.

BACKGROUND

As technology advances to provide greater mobility, more and more people are carrying and using multiple wireless electronic devices (i.e., an ensemble) for a variety of reasons such as work, education, and/or entertainment. For example, a person may carry and use an ensemble of portable wireless electronic devices including a laptop computer, a handheld computer, a tablet computer, a wireless (e.g., cordless or cellular) telephone, a pager, an audio and/or video player (e.g., an MP3 player or a digital video disc (DVD) player), a game device, a digital camera, a navigation device (e.g., a global positioning system (GPS) device), and/or a wireless peripheral (e.g., a keyboard, a mouse, a printer, etc.).

Many of the wireless electronic devices mentioned above may operate in various modes that require different amount of power. In particular, a wireless electronic device may operate in an active mode, which requires a greater amount of power relative to other operating modes (i.e., high power consumption level). In the active mode, the wireless electronic device may execute an application or a program to generate a visual output on a display screen and/or an audio output via a speaker, to receive a user input via a human interface device, to read and/or write to a memory, and/or to transmit and/or receive communication information for an individual to converse in a phone call, check for voice messages, browse the Internet, etc. For example, a cellular telephone may require full power to operate in the active mode for the individual to place and/or receive a phone call. The wireless electronic device may also operate in an idle or standby mode when the individual is not actively operating the wireless electronic device but the wireless electronic device is readily available to operate in the active mode when necessary. For example, a cellular telephone may operate in the idle mode to monitor for a paging message from one or more base stations via a paging channel. In particular, the paging message is indicative of an incoming communication such as a voice call, a text message, streaming media, etc. Thus, the cellular telephone may require less power to operate in the idle mode than in the active mode (i.e., medium power consumption level).

To further reduce power consumption, the wireless electronic device may operate in a sleep mode (i.e., low power consumption level) by disabling or shutting down components that are not in use (e.g., display screens, disk drives, application processor, transceivers, etc.). The wireless electronic device may wake up periodically from the sleep mode and operate in the idle mode to monitor for incoming communications. For example, a cellular telephone may wake up from the sleep mode to monitor for a paging message indicative of an incoming communication from one or more base stations via a paging channel. The wireless electronic device may automatically operate in the sleep mode when the wireless electronic device is unused for a predefined time period and/or after operating the idle mode. Alternatively, an individual may manually trigger the wireless electronic device to operate in the sleep mode.

Today, many of the wireless electronic devices mentioned above may have similar or identical wireless communication capabilities. In one particular example, some cellular telephones and handheld computers may operate in accordance with an identical wireless communication protocol such as Global System for Mobile communications (GSM), General Packet Radio Services (GPRS), Wideband CDMA (WCDMA), Universal Mobile Telecommunications System (UMTS), Wireless Application Protocol (WAP), etc. to communicate with communication networks. However, wireless electronic devices in an ensemble fail to coordinate with the each other to perform similar or identical tasks. For example, a cellular telephone and a handheld computer in an ensemble of wireless electronic devices may individually monitor a paging channel for incoming communications. Although each of the wireless electronic devices in the ensemble may reduce power consumption individually by operating in different modes (e.g., idle mode and/or sleep mode), the ensemble of wireless electronic devices fails to operate collectively and share common resources to further manage and optimize power consumption.

DETAILED DESCRIPTION

In general, methods and apparatus for providing a communication proxy system are described herein. According to one example embodiment, a communication proxy system may be configured to manage power consumption for an ensemble of wireless electronic devices (e.g., a laptop computer, a handheld computer, a tablet computer, a wireless telephone, a pager, an audio and/or video player, a game device, a digital camera, a navigation device, a wireless peripheral, etc.). In particular, the ensemble of wireless electronic devices may include a proxy device and one or more client devices. To reduce power consumption, the client devices may operate in a sleep mode and disable (e.g., shut off) components that are not in use (e.g., display screens, disk drives, application processor, transceivers, etc.). The proxy device may receive control information from one or more client devices. For example, the control information may include information associated with a wireless communication link associated with one of the client devices and a communication network (e.g., a paging channel). Based on the control information, the proxy device may monitor the wireless communication link for a notification from the communication network to the corresponding client device while that particular client device continues to operate in the sleep mode to further reduce power consumption. For example, the notification from the communication network may be a paging message to notify the client device of an incoming communication such as a voice call, a text message, and/or streaming media such as images, audio/video clips, etc. In response to detecting a notification from the communication network, the proxy device may transmit an alert (e.g., a wake up call, message, and/or ping) to the client device. Accordingly, the client device may prepare and enable any previously-disabled components to receive the incoming communication. As a result, the ensemble of wireless electronic devices may manage power consumption more efficiently as described in detail below. However, the present disclosure is not limited in this regard.

Figure 1:
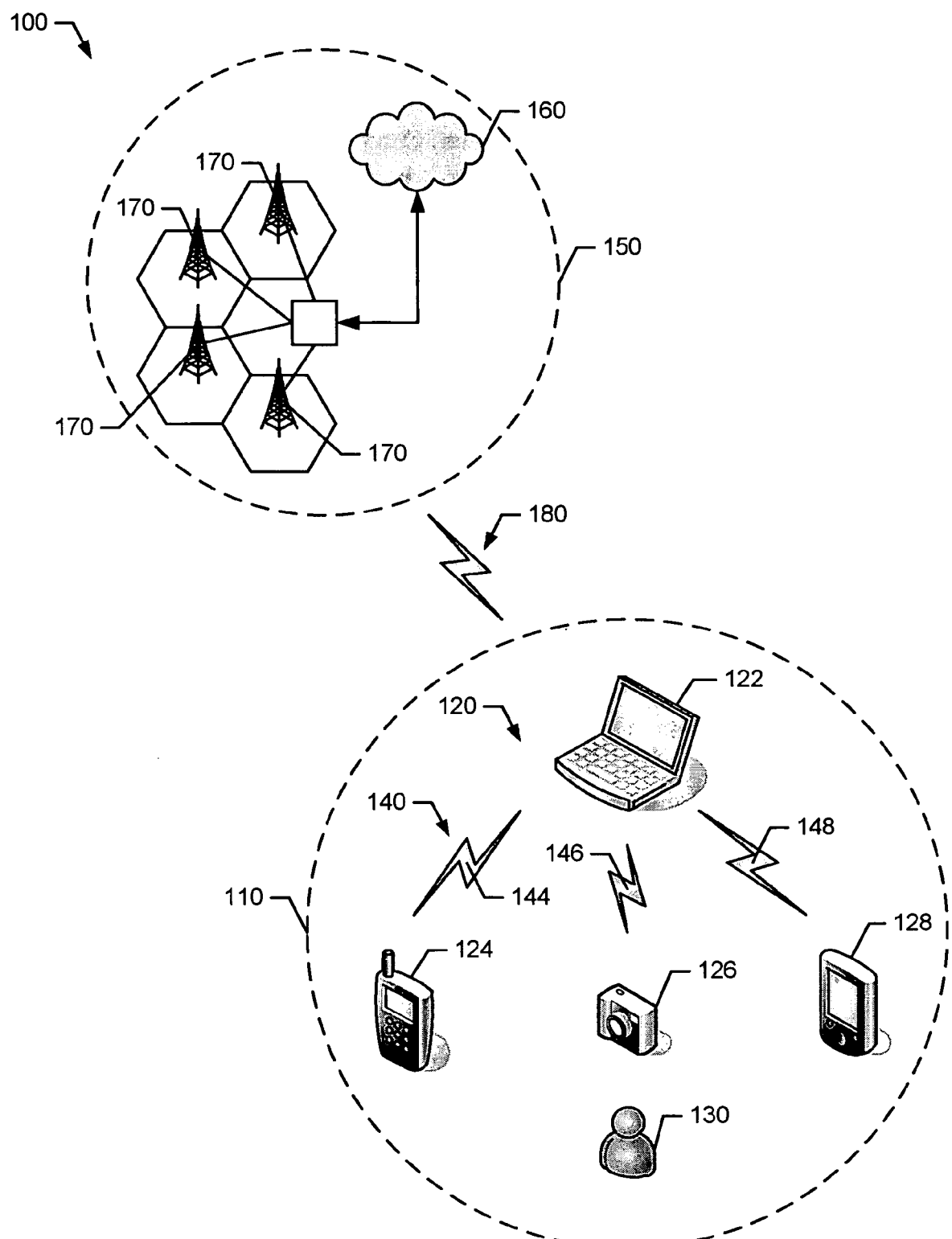
FIG. 1 is a schematic diagram representation of an example wireless communication system according to an embodiment of the methods and apparatus disclosed herein.

Referring to FIG. 1, an example wireless communication system 100 including a communication proxy system 110 is described herein. In particular, the communication proxy system 110 may include an ensemble of wireless electronic devices 120, generally shown as 122, 124, 126, and 128. For example, the ensemble of wireless electronic devices may include a laptop computer, a handheld computer, a tablet computer, a cellular telephone (e.g., a smart phone), a pager, an audio and/or video player (e.g., an MP3 player or a DVD player), a game device, a digital camera, a navigation device (e.g., a GPS device), a wireless peripheral (e.g., a keyboard), a remote control, and/or other suitable wireless electronic devices. An individual 130 may use and/or carry the ensemble of wireless electronic devices 120 to perform a variety of daily tasks for work, school, and/or leisure. Although FIG. 1 depicts four wireless electronic devices, the ensemble 120 may include additional or fewer wireless electronic devices used and/or carried by the individual 130.

The ensemble of wireless electronic devices 120 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other via short-range or distance wireless communication links 140, generally shown as 144, 146, and 148. For example, the laptop computer 122 may implement OFDM modulation to transmit large amounts of digital data by splitting a radio frequency signal into multiple small sub-signals, which in turn, are transmitted simultaneously at different frequencies to the cellular telephone 124 via the short-range wireless communication link 144. In particular, the ensemble of wireless electronic devices 120 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via the short-range wireless communication links with each other. The ensemble of wireless electronic devices 120 may also operate in accordance with other suitable wireless communication protocols that require very low power such as Bluetooth, Ultra Wideband (UWB), Near Field Communication (NFC), and/or radio frequency identification (RFID) to communicate with each other via the short-range of wireless communication links 140. Alternatively, the ensemble of wireless electronic devices 120 may communicate with each other via wired communication links (not shown). For example, the ensemble of wireless electronic devices 120 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate with each other. The methods and apparatus described herein are not limited in this regard.

The wireless communication system 100 also includes a communication network 150, which may include a core network 160 and one or more radio access networks (RANs). Each RAN may include one or more base stations, generally shown as 170, and other radio components necessary to provide communication services to the ensemble of wireless electronic devices 120. The base stations 170 may operate in accordance with the applicable standard(s) for providing wireless communication services to the ensemble of wireless electronic devices 120. That is, each wireless electronic device in the ensemble 120 is configured to operate in accordance with one or more of several wireless communication protocols to communicate with the communication network 150 via a communication link 180. In particular, these wireless communication protocols may be based on analog, digital, and/or dual-mode communication system standards such as the Global System for Mobile Communications (GSM) standard, the Frequency Division Multiple Access (FDMA) standard, the Time Division Multiple Access (TDMA) standard, the Code Division Multiple Access (CDMA) standard, the Wideband CDMA (WCDMA) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards.

Further, the wireless communication system 100 may include other wireless local area network (WLAN) devices, wireless metropolitan area network (WMAN) devices, and/or wireless wide area network (WWAN) devices (not shown). For example, the wireless communication system 100 may include devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
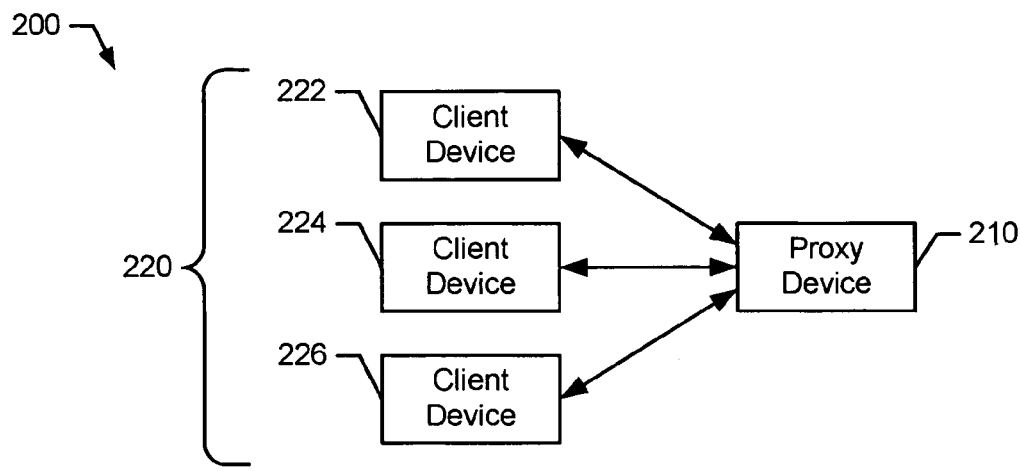
FIG. 2 is a block diagram representation of an example communication proxy system.

In the example of FIG. 2, a communication proxy system 200 may include a proxy device 210 and one or more client devices 220, generally shown as 222, 224, and 226. The proxy device 210 and the client devices 220 may form the ensemble of wireless electronic devices 120 as described above. For example, the proxy device 210 may be a laptop computer (e.g., one shown as 122 in FIG. 1), and the client devices 220 may include a cellular telephone, a digital camera, and/or a handheld computer (e.g., shown as 124, 126, and/or 128, respectively, in FIG. 1). Although FIG. 2 depicts one proxy device and three client devices, the communication proxy system 200 may include other variations and/or combinations of proxy and client devices. For example, the communication proxy system 200 may include two or more proxy devices.

The ensemble of wireless electronic devices 120 may automatically select one of the wireless electronic devices to operate as the proxy device 210 with the remaining wireless electronic device(s) operating as client devices 220. For example, the ensemble of wireless electronic devices 120 may designate the proxy device 210 based on the power level of all of the wireless electronic devices in the ensemble 120 (e.g., battery life). In particular, the wireless electronic device having the highest power level among all of the wireless electronic devices in the ensemble 120 may be selected as the proxy device 210. Thus, the remaining wireless electronic devices may conserve power by operating as client devices 220. The ensemble of wireless electronic devices 120 may also select one of the wireless electronic devices to operate as the proxy device 210 based on which wireless electronic device is currently being used or was last used by the individual 130. In another example, each of the wireless electronic devices in the ensemble 120 may take turn to operate as the proxy device 210 for a predefined time period in a round-robin manner (e.g., a duty cycle of one hour). Alternatively, the individual 130 may designate one of the wireless electronic devices in the ensemble 120 as the proxy device 210. Although the examples described above disclose designating one of the wireless electronic devices in the ensemble 120 as the proxy device 210, two or more of the wireless electronic devices in the ensemble 120 may be designated as proxy devices 210.

Figure 3:
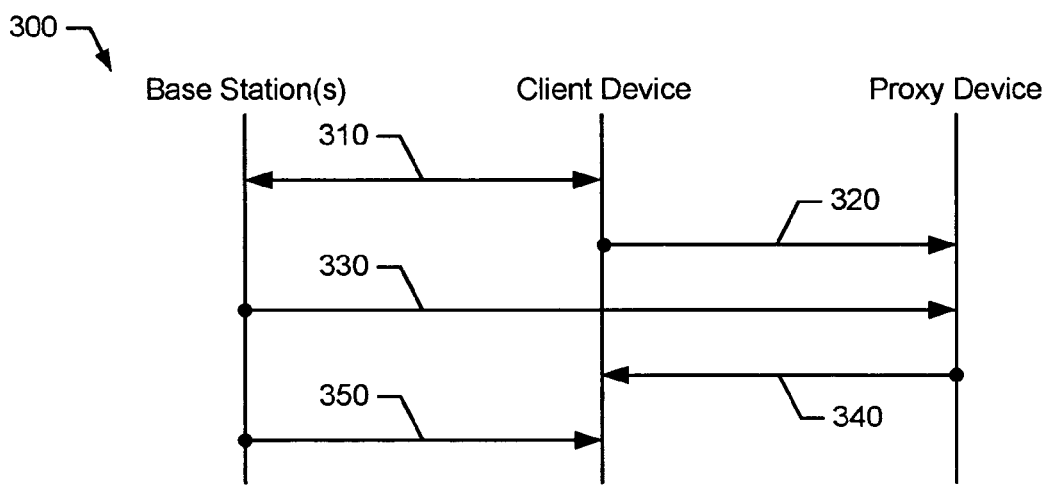
FIG. 3 is a sequence diagram representation of one manner in which the example communication proxy system of FIG. 2 may be implemented.

Typically, each of the client devices 220 is configured to receive incoming communication including voice calls, text messages, and/or streaming media from the base station 170 (FIG. 1) via a wireless communication link. In particular, the client devices 220 may receive a notification (e.g., a page) from the base station 170 prior to receipt of the incoming communication. Turning to FIG. 3, for example, the client device 222 may negotiate with the base station 170 for a paging channel to receive such notification from the base station 170. The client device 222 may negotiate with the base station 170 for the paging channel when the client device 222 is powered up for service (e.g., registration), the client device 222 is within an area (e.g., a communication cell) serviced by the base station 170, etc. (310).

As noted above, most wireless electronic devices may operate in multiple modes that require different amount of power. Similar to existing wireless electronic devices, the client device 222 may operate in an active mode, an idle mode, and/or a sleep mode. In particular, the client device 222 may provide a variety of services such as communication services to the individual 130 in an active mode. For example, the individual 130 may answer an incoming call and/or place an outgoing call when the client device 222 is operating in the active mode. In an idle mode (or standby mode), the client device 222 may monitor the paging channel for a paging message from the base station 170 to notify the client device 222 of an incoming communication such as a voice call, a text message, and/or streaming media. To conserve power, the client device 222 may operate in a sleep mode. In particular, the client device 222 may disable (i.e., shut off) unused components for a time period and/or until a trigger event occurs (e.g. a sleep state). For example, a laptop computer may disable the display screen and/or a disk drive. In another example, a cellular telephone may disable the receiver (e.g., one shown as 710 in FIG. 7) to receive a paging message. Accordingly, the client device 222 may wake up periodically and monitor the paging channel for a paging message from the base station 170.

In contrast to existing wireless electronic devices, the client device 222 may operate in a proxy mode to further reduce power consumption. In particular, the client device 222 may transmit control information to the proxy device 210 to operate in the proxy mode (320). For example, the control information may include information associated with a paging channel that the client device 222 and the base station 170 previously negotiated. Alternatively, the proxy device 210 may negotiate with the base station 170 and/or a different base station for a paging channel associated with the client device 222. Based on the control information, the proxy device 210 may monitor for the paging message from the base station 170 for the client device 222. Likewise, the proxy device 210 may monitor the corresponding paging channels for the client devices 224 and 226. Instead of each of the client devices 220 individually monitoring for a paging message from the base station 170 on a corresponding paging channel, the proxy device 210 may monitor the paging channels for paging messages for all of the client devices 220 while each of the client devices 220 remains in the sleep state. Without having to wake up periodically and monitor its corresponding paging channel for a paging message from the base station 170, each of the client devices 220 may conserve more power.

In response to detecting a paging message for the client device 222 from the base station 170 via the paging channel (330), the proxy device 210 may transmit an alert (e.g., wake up call, message, or ping) to the client device 222 so that the client device 222 may prepare to receive an incoming communication (340). For example, the client device 222 may switch from the proxy mode and operate in the idle mode to receive the incoming communication in response to the wake up call, message, or ping from the proxy device 210. Accordingly, the client device 222 may receive the incoming communication from the base station 170 without monitoring the paging channel (350). In one example, the proxy device 210 may automatically transmit information associated with the incoming communication to the client device 222. Alternatively, the client device 222 may query the proxy device 210 for the information associated with the incoming communication. Based on the information associated with the incoming communication, the client device 222 may receive an incoming call, message and/or media from the communication network 150 (e.g., via the base station 170 and/or other base stations associated with the communication network 150).

Figure 4:
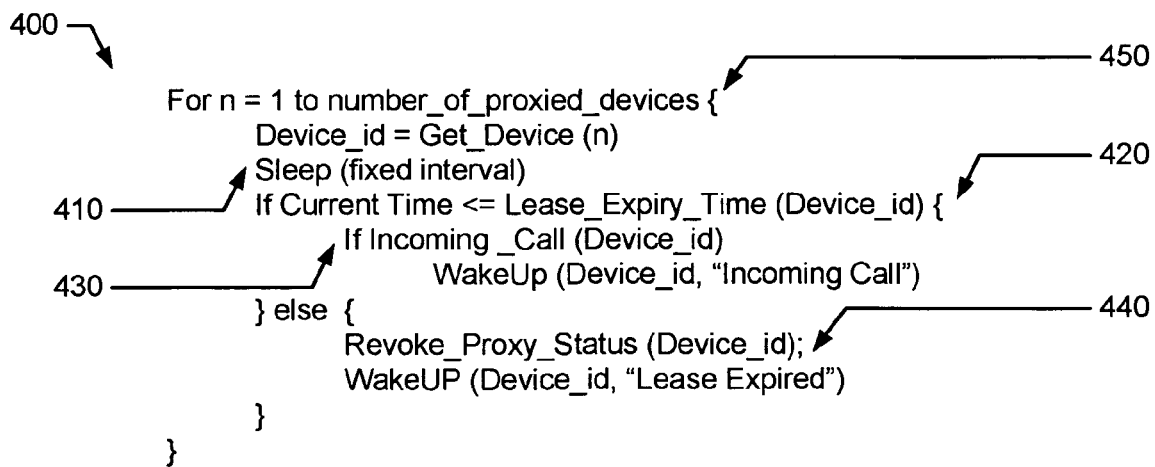
FIG. 4 depicts a high-level language example of code that may be used to implement the example client device of FIG. 2.

Referring to FIG. 4, the illustrated high-level language code 400 may be one example to configure the client devices 220 to enable the proxy mode. In particular, FIG. 4 depicts one manner in which each of the example client devices 220 of FIG. 2 may be configured to operate in the proxy mode as described in connection with FIGS. 5 and 6. The example processes 500 and 600 of FIGS. 5 and 6, respectively, may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Figure 5:
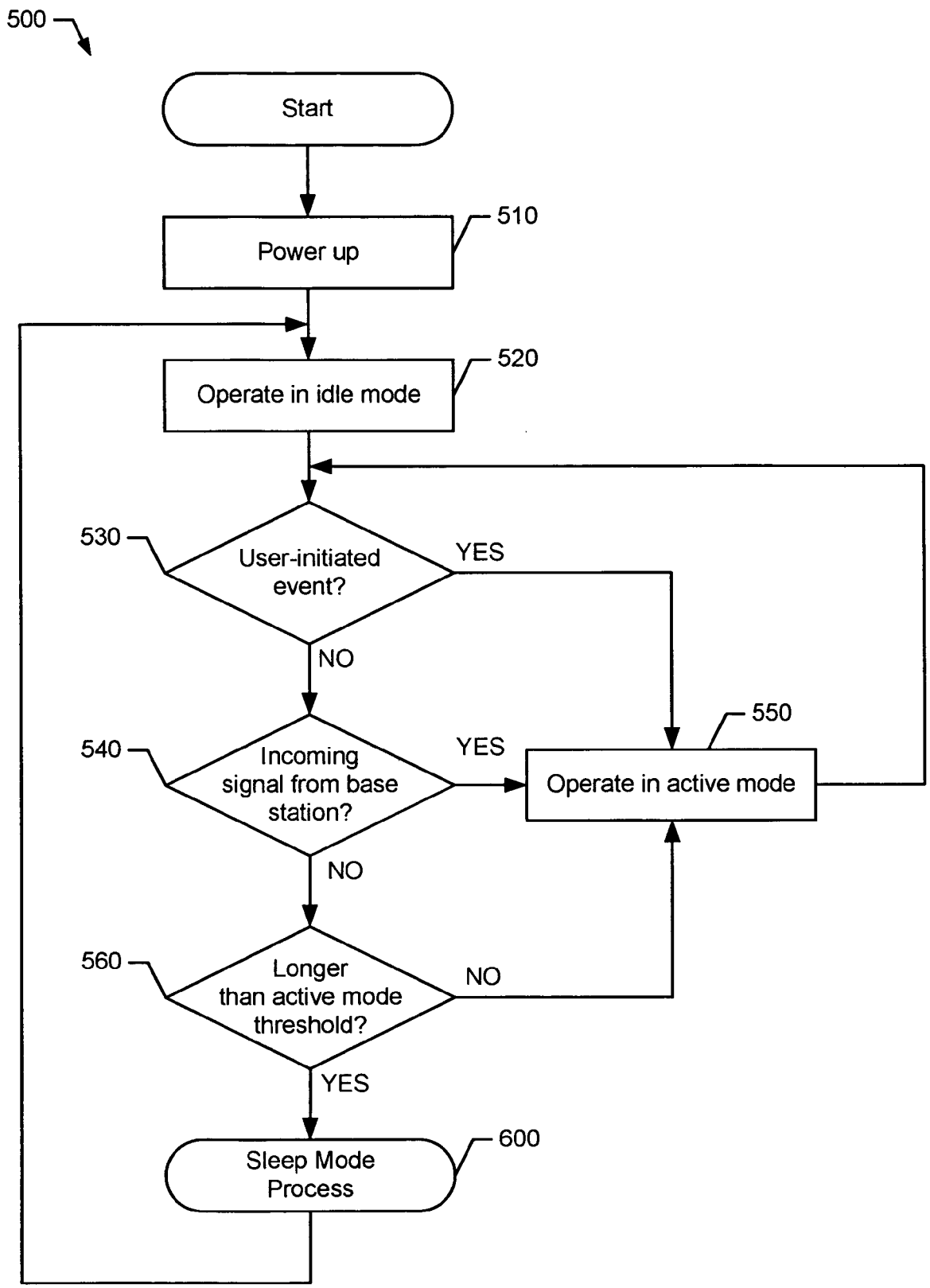
FIG. 5 is a flow diagram representation of one manner in which an example client device of FIG. 2 may be configured to operate in an active mode and an idle mode.
Figure 6:
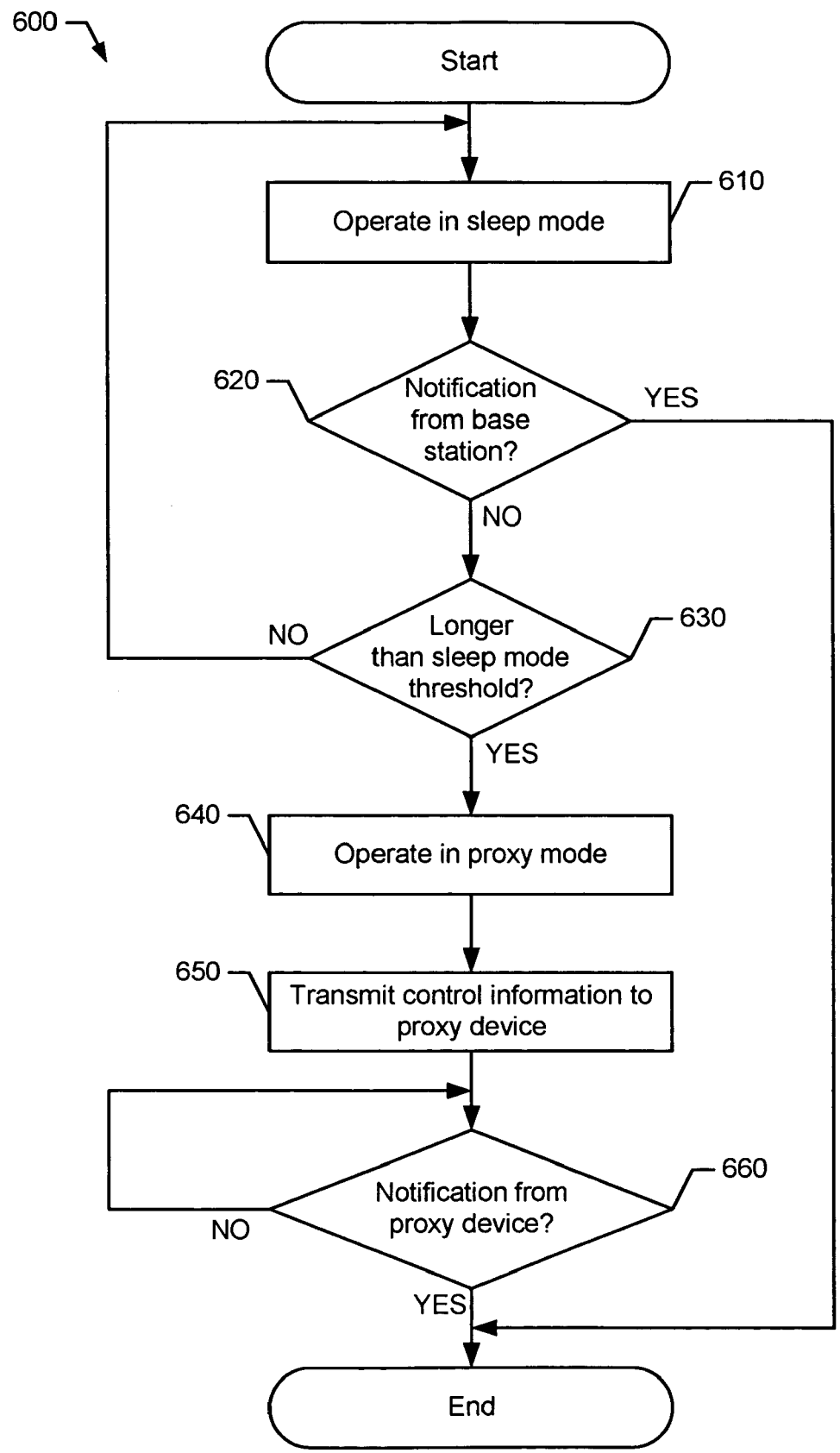
FIG. 6 is a flow diagram representation of one manner in which the example client device of FIG. 2 may be configured to operate in a sleep mode and a proxy mode.

Further, although a particular order of actions is illustrated in FIGS. 5 and 6, these actions can be performed in other temporal sequences. Again, the example processes 500 and 600 are merely provided and described in conjunction with the apparatus of FIGS. 1 and 2 as an example of one way to configure a wireless electronic device to operate as one of the example client devices 220 in the communication proxy system 200.

In the example of FIG. 5, the process 500 begins with a client device (e.g., one shown 222 of FIG. 2) being powered up for service (block 510). As noted above, the client device 222 may be a laptop computer, a handheld computer, a tablet computer, a cellular telephone, a pager, an audio and/or video player, a game device, a digital camera, a navigation device, etc. The client device 222 may operate in the idle mode to determine whether to operate in the active mode (block 520). In particular, the client device 222 may monitor for a user-initiated event associated with a service (block 530). For example, the client device 222 may monitor for a user-initiated event such as pressing one or more buttons to initiate an outgoing voice call and/or other device-dependent applications such as a displaying text and/or image, providing a calendar, a contact list, and/or a calculator, playing music and/or video, etc. If the client device 222 detects a user-initiated event, the client device 222 proceeds to operate in the active mode (block 550). In the active mode, the client device 222 may provide the individual 130 with the example services mentioned above. Control returns to block 530 to determine whether to continue operating in the active mode.

Otherwise if the client device 222 fails to detect a user-initiated event at block 530, the client device 222 monitors for a notification from a base station 170 (FIG. 1) (block 540). For example, the notification may be a paging message indicative of an incoming communication such as a voice call, a text message, streaming media, etc. If the client device 222 detects a notification, the client device 222 proceeds to operate in the active mode (block 550). If the client device 222 fails to detect a notification, the client device 222 determines whether the client device 222 has been operating in the active mode for a time period longer than a predefined, active mode threshold to conserve power (block 560). If the client device 222 has been operating in the active mode for a time period less than the active mode threshold, the client device 222 continues to operate in the active mode. Otherwise, if the client device 222 has been operating in the active mode for a time period longer than the active mode threshold, the client device 222 proceeds to the sleep/proxy mode process 600 as described in detail below.

Turning to FIG. 6, the sleep/proxy mode process 600 begins with the client device 222 switching from the active mode and operating in the sleep mode (block 610). In particular, the client device 222 may disable (i.e., little power) or shut off power to various components during the sleep mode to conserve power (e.g., 410 of FIG. 4). For example, the client device 222 may be a cellular telephone with a display screen (not shown) to generate text/images and a receiver (e.g., one shown as 710 in FIG. 7) to receive incoming communication. In the sleep mode, the client device 222 may turn off the backlight of the display screen. In another example, the client device 222 may turn off the receiver for a predefined time period. Accordingly, the client device 222 may wake up periodically by turning on the receiver and monitor for a notification from the base station 170 via the receiver (block 620). As noted above, for example, the base station 170 may transmit a paging message to notify the client device 222 of an incoming communication. If the client device 222 receives a notification from the base station 170, the client device 222 terminates the sleep/proxy mode process 600 and control returns to block 520 of FIG. 5 so that client device 222 may prepare to receive the incoming communication. Otherwise, if the client device 222 fails to receive a notification from the base station 170, the client device 222 determines whether the client device 222 has been operating in the sleep mode for a time period longer than a predefined, sleep mode threshold (e.g., 420 of FIG. 4) (block 630).

If the client device 222 has been operating in the sleep mode for a time period less than the sleep mode threshold, control returns to block 610 so that the client device 222 continues to operate in the sleep mode. Otherwise, if the client device 222 has been operating in the sleep mode for a time period longer than the sleep mode threshold, the client device 222 begins to operate in a proxy mode (block 640). As noted above, the client device 222 may further reduce power consumption by operating the proxy mode. In particular, client device 222 transmits control information to the proxy device 210 (block 650). For example, the control information may include information associated with a paging channel used by the communication network 150 (e.g., via the base station 170) to notify the client device 222 of an incoming communication. Based on the control information, the proxy device 210 monitors the paging channel for the client device 222. As a result, the client device 222 may continue to operate in the sleep mode without having to wake up periodically and monitor the paging channel for a notification from the base station 170. Various components of the client device 222 may remain disabled (i.e., little or no power) until the client device 222 receives an alert from the proxy device 210 (e.g., 430 of FIG. 4) (block 660). For example, the receiver of the client device 222 may be disabled from receiving incoming communication from the base station 170 (e.g., via the communication link 180) until the proxy device 210 transmits an alert to the client device 222 of the notification from the base station 170. If the client device 222 fails to receive an alert from the proxy device 210, the client device 222 continues to operate in the proxy mode and wait for an alert from the proxy device 210. Otherwise, if the client device 222 receives an alert from the proxy device 210, the client device 222 stops operating in the proxy mode and control returns to block 520 of FIG. 5 so that client device 222 may prepare to receive the incoming communication (e.g., 440 of FIG. 4). For example, the receiver of the client device 222 may be enabled to receive incoming communication from the base station 170 via the communication link 180. By listening for the alert from the proxy device 210 in accordance with a short-range wireless communication protocol, the client device 222 may consume less power than if the client device 222 monitored the paging channel for a notification from the base station 170. Although the example processes 500 and 600 are described above in conjunction with the client device 222, the processes 500 and 600 may be implemented by the client devices 224 and/or 226 to operate in the proxy mode (e.g., 450 of FIG. 4). Thus, ensemble of wireless electronic devices 120 may conserve more power with one of the wireless electronic devices (i.e., the proxy device 210) operating in the idle mode for the ensemble 120 while the remaining wireless electronic devices (i.e., the client devices 220) operate in the sleep mode.

Figure 7:
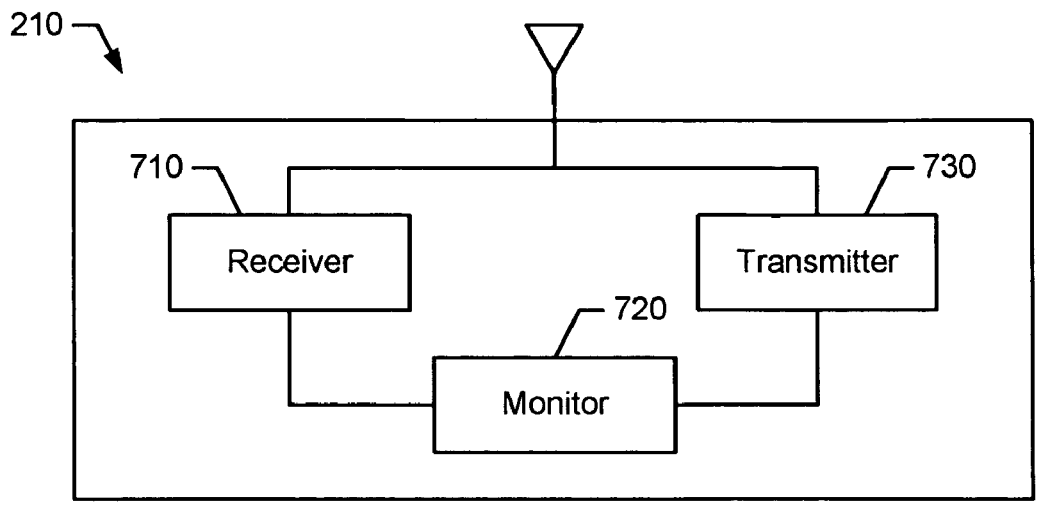
FIG. 7 is a detailed block diagram representation of an example proxy device that may be used with the example communication proxy system of FIG. 2.

As noted above, one or more of the wireless electronic devices of the ensemble 120 (FIG. 1) may be selected as the proxy device 210 (FIG. 2) in a variety of manners. Thus, any of the wireless electronic devices of the ensemble 120 may operate as the proxy device 210. Referring to FIG. 7, the proxy device 210 may include a receiver 710, a monitor 720, and a transmitter 730. The receiver 710 is configured to receive control information from the client devices 220 (FIG. 2). In particular, the control information is associated with a communication link between a client device (e.g., one shown as 222 in FIG. 2) and the communication network (e.g., one shown as 150 in FIG. 1). For example, the control information from the client device 222 may include information associated with a paging channel negotiated with the base station 170 and/or other base stations. As noted above, the base station 170 may use the paging channel to communicate with the client device 222. For example, the base station 170 may transmit a paging message to the client device 222 via the paging channel to notify the client device 222 of an incoming communication such as a voice call, a text message, streaming media, etc. Based on the control information, the monitor 720 monitors for a notification associated with the client device 222 from the base station 170. If the monitor 720 detects a notification associated with the client device 222, the transmitter 730 transmits an alert (e.g., a wake up call, message, or ping) to the client device 222 so that client device 222 may be configured to receive the incoming communication from the base station 170. For example, the client device 222 may switch from the sleep mode and operate in the idle mode to receive the incoming communication.

While the components shown in FIG. 7 are depicted as separate blocks within the proxy device 210, the functions performed by some of these blocks may be integrated within a single semiconductor circuit or may be implemented using two or more separate integrated circuits. For example, although the receiver 710 and the transmitter 730 are depicted as separate blocks within the proxy device 210, the receiver 710 may be integrated into the transmitter 730 (e.g., a transceiver). Further, although the components of FIG. 7 are described above in conjunction with the client device 222, the components of FIG. 7 may be implemented so that the client devices 224 and/or 226 may also operate in the proxy mode.

Figure 8:
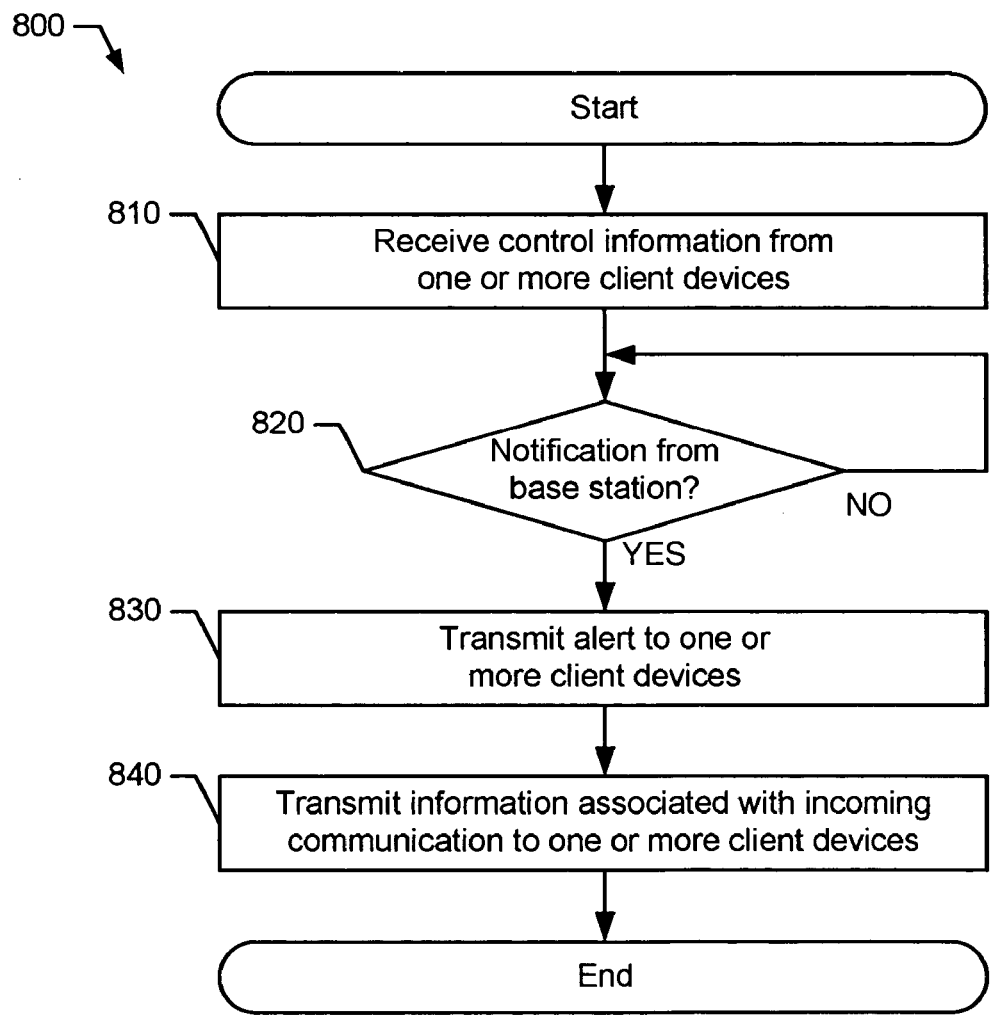
FIG. 8 is a flow diagram representation of one manner in which an example proxy device of FIG. 7 may be configured to implement the example communication proxy system of FIG. 2.

In the example of FIG. 8, the process 800 begins with the proxy device 210 (e.g., via the receiver 710) receiving control information from one or more of the client devices 220 (FIG. 2) (block 810). In particular, the control information may include information associated with communication links between the client devices 220 and the communication network 150. For example, the receiver 710 may receive information associated with paging channels used by the base stations 170 to communicate and notify the client devices 220 of incoming communications such as voice calls, text messages, streaming media, etc. Based on the control information, the monitor 720 monitors the communication link for a notification from the communication network 150 (block 820). For example, the monitor 720 may monitor a paging channel associated with the client device 222 for a page indicative of an incoming communication for the client device 222. If the monitor 720 fails to detect a notification from the communication network 150 via the communication link, the monitor 720 continues to monitor the communication link for the client device 222. Otherwise, if the monitor 720 detects a notification from the communication network 150 via the communication link, the transmitter 730 alerts the client device 222 to prepare to receive an incoming communication from the communication network 150 (block 830). For example, the transmitter 730 may transmit a wake up call, message, or ping to the client device 222 so that the client device 222 may prepare to receive the incoming communication as described above. Accordingly, the proxy device 210 may automatically transmit information associated with the incoming communication (block 840). Alternatively, the client device 222 may query the proxy device 210 for the information associated with the incoming communication. Based on the information associated with the incoming communication, the client device 222 may receive the incoming communication from the communication network 150 (e.g., via the base station 170).

Although the methods and apparatus disclosed herein are well suited for voice calls and/or messages, the methods and apparatus disclosed herein are readily applicable to many other types of communication services such as short messaging service (SMS), enhanced messing service (EMS), multimedia messaging service (MMS), etc. For example, the methods and apparatus disclosed herein may be implemented to wireless communication systems that support communication of text, images, streaming audio/video clips, and/or any other multimedia applications. Further, while the methods and apparatus disclosed herein are described with respect to wireless personal area networks (WPANs), the methods and apparatus disclosed herein may be applied to other suitable types of wireless communication networks. For example, the methods and apparatus disclosed herein may be applied to wireless local area networks (WLANs), wireless metropolitan area networks (WMANs), and/or wireless wide area networks (WWANs).

While the methods and apparatus disclosed herein are described with respect to portable wireless electronic devices, the methods and apparatus disclosed herein may be applied to other suitable types of wireless electronic devices. For example, the methods and apparatus disclosed herein may be applied to relatively-stationary wireless electronic devices such as a desktop computer, an external display, an access point device, a mesh point device, a television, a household appliance, etc.

Figure 9:
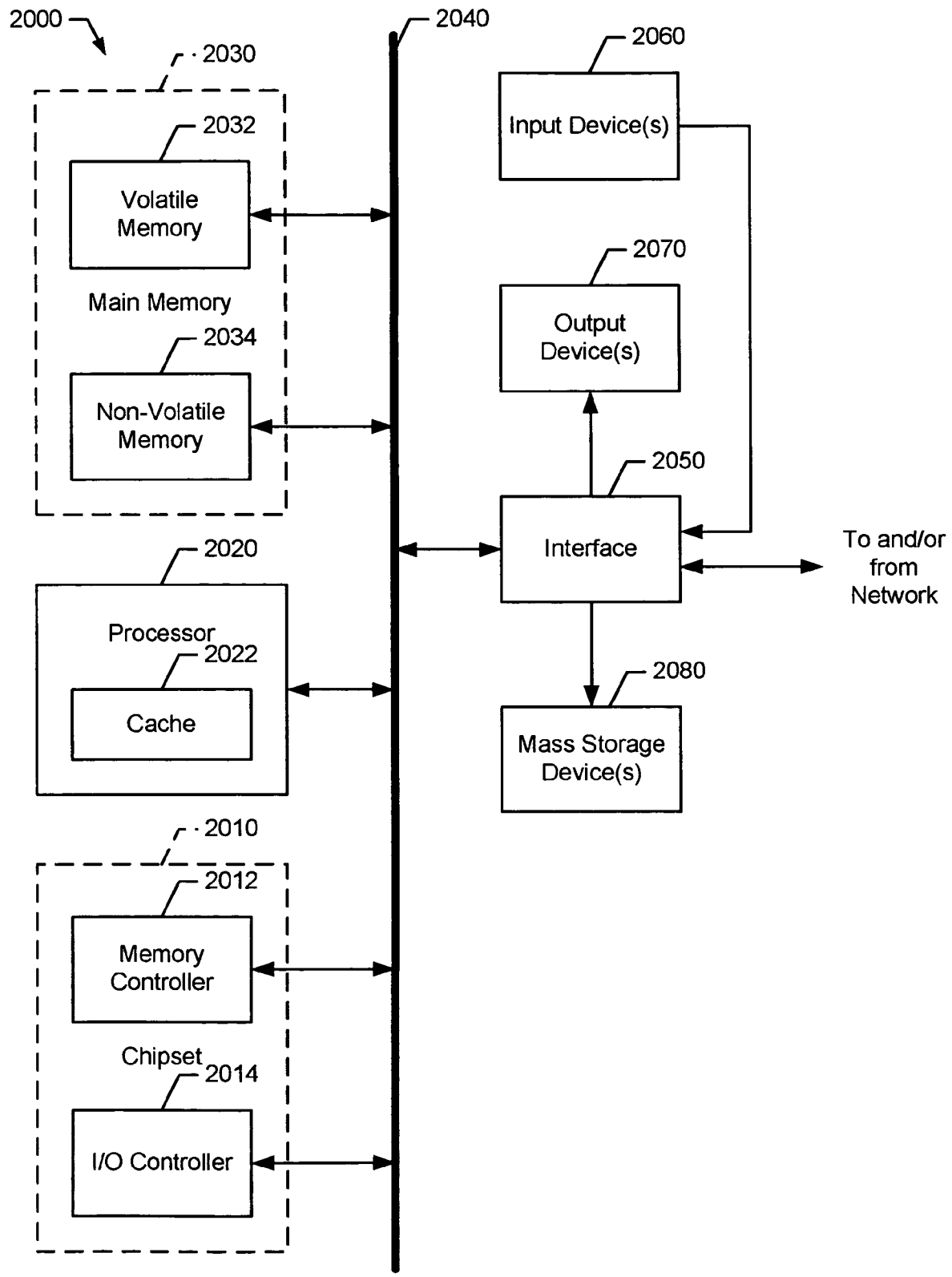
FIG. 9 is a block diagram representation of an example processor system that may be used to implement the example communication proxy system of FIG. 2.

FIG. 9 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 9 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 is implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 includes a cache 2022, which may be implemented using a first-level unified cache (L1), a second-level unified cache (L2), a third-level unified cache (L3), and/or any other suitable structures to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well known interface standard such as an Ethernet interface, a universal serial bus (USB), a third generation input/output interface (3GIO) interface, and/or any other suitable type of interface.

One or more input devices 2060 are connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 9 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   receiving control information associated with a first wireless electronic device at a second wireless electronic device;
   detecting a notification from a communication network based on the control information at the second wireless electronic device, the notification being indicative of an incoming communication from the communication network to the first wireless electronic device; and
   transmitting an alert to the first wireless electronic device from the second wireless electronic device;
   wherein receiving the control information associated with the first wireless electronic device at the second wireless electronic device comprises receiving information associated with a wireless communication link associated with the first wireless electronic device and the communication network.

2. A method as defined in claim 1, wherein receiving the control information associated with the first wireless electronic device at the second wireless electronic device comprises receiving information associated with a paging channel associated with the first wireless electronic device and the communication network.

3. A method as defined in claim 1, wherein detecting the notification from the communication network comprises detecting a paging message indicative of one or more of an incoming call, message, or media associated with the first wireless electronic device from a base station associated with the communication network.

4. A method as defined in claim 1, wherein transmitting the alert to the first wireless electronic device from the second wireless electronic device comprises transmitting one or more of a wake up call, message, or ping to the first wireless electronic device from the second wireless electronic device.

5. A method as defined in claim 1, wherein transmitting the alert to the first wireless electronic device from the second wireless electronic device comprises transmitting the alert to the first wireless electronic device from the second wireless electronic device via a wireless communication link in accordance with a short-range wireless communication protocol.

6. A method as defined in claim 1 further comprising transmitting information associated with an incoming communication to the first wireless electronic device from the second wireless electronic device in response to a query from the first wireless electronic device.

7. A method as defined in claim 1, wherein the first and second wireless electronic devices being associated with an ensemble of wireless electronic devices, and the ensemble of wireless electronic devices comprises one or more of a laptop computer, a handheld computer, a tablet computer, a personal data assistant, a wireless telephone, a pager, an audio/video player, a game device, a digital camera, or a navigation device.

8. An article of manufacture, comprising
   a computer-readable medium having stored thereon instructions operable to:

receive control information associated with a first wireless electronic device at a second wireless electronic device;

detect a notification from a communication network based on the control information at the second wireless electronic device, the notification being indicative of an incoming communication from the communication network to the first wireless electronic device; and wherein said receive is by receiving information associated with a wireless communication link associated with the first wireless electronic device and the communication network.

9. An article of manufacture as defined in claim 8, wherein the instruction further operable to receive the control information from the first wireless electronic device at the second wireless electronic device by receiving information associated with a paging channel associated with the first wireless electronic device and the communication network.

10. An article of manufacture as defined in claim 8, wherein the instruction further operable to detect the notification from the communication network to the first wireless electronic device by detecting a paging message indicative of one or more of an incoming call, message, or media associated with the first wireless electronic device from a base station associated with the communication network.

11. An article of manufacture as defined in claim 8, wherein the instruction further operable to transmit the alert to the first wireless electronic device from the second wireless electronic device by transmitting one or more of a wake up call, message, or ping to the first wireless electronic device from the second wireless electronic device.

12. An article of manufacture as defined in claim 8, wherein the instruction further operable to transmit the alert to the first wireless electronic device from the second wireless electronic device by transmitting the alert to the first wireless electronic device from the second wireless electronic device via a wireless communication link in accordance with a short-range wireless communication protocol.

13. An article of manufacture as defined in claim 8, wherein the first and second wireless electronic devices being associated with an ensemble of wireless electronic devices, and the assemble of wireless electronic devices comprises one or more of a laptop computer, a handheld computer, a tablet computer, a personal data assistant, a wireless telephone, a pager, an audio/video player, a game device, a digital camera, or a navigation device.

14. An apparatus comprising:
a receiver to receive control information associated with a first wireless electronic device at a second wireless electronic device;
a monitor to detect a notification from a communication network based on the control information at the second wireless electronic device, the notification being indicative of an incoming communication from the communication network to the first wireless electronic device; and
a transmitter to transmit an alert to first wireless electronic device from the second wireless electronic device;
wherein the control information comprises information associated with a wireless communication link associated with the first wireless electronic device and the communication network.

15. An apparatus as defined in claim 14, wherein the control information comprises information associated with a paging channel associated with the first wireless electronic device and the communication network.

16. An apparatus as defined in claim 14, wherein the notification comprises a paging message indicative of one or more of an incoming call, message, or media associated with the first wireless electronic device.

17. An apparatus as defined in claim 14, wherein the alert comprises one or more of a wake up call, message, or ping.

18. An apparatus as defined in claim 14, wherein the first and electronic devices, and the ensemble of wireless electronic devices comprises one or more of a laptop computer, a handheld computer, a tablet computer, a personal data assistant, a wireless telephone, a pager, an audio/video player, a game device, or a navigation device.

19. A system comprising:
a flash memory; and
a processor coupled to the flash memory to receive control information associated with a first wireless electronic device at a second wireless electronic device, the control information comprises information associated with a wireless communication link associated with the first wireless electronic device and a communication network, the processor to detect a notification from the communication network based on the control information at the second wireless electronic device, and to transmit an alert to the first wireless electronic device from the second wireless electronic device,
wherein the notification is indicative of an incoming communication from the communication network to the first wireless electronic device.

20. A system as defined in claim 19, wherein the control information comprises information associated with a paging channel associated with the first wireless electronic device and the communication network.

21. A system as defined in claim 19, wherein the notification comprises a paging message indicative of one or more of an incoming call, message, or media associated with the first wireless electronic device.

22. A system as defined in claim 19, wherein the alert comprises one or more of a wake up call, message, or ping.

23. A system as defined in claim 19, wherein the first and second wireless electronic devices are associated with an ensemble of wireless electronic devices and the ensemble of wireless electronic devices comprises one or more of a laptop computer, a handheld computer, a tablet computer, a personal data assistant, a wireless telephone, a pager, an audio/video player, a game device, or a navigation device.

24. A method comprising:
transmitting control information associated with a first wireless electronic device to a second wireless electronic device;
enabling a sleep mode associated with the first wireless electronic device;
disabling the sleep mode at the first wireless electronic device in response to receipt of an alert from the second wireless electronic device; and
wherein transmitting the control information associated with the first wireless electronic device to the second wireless electronic device comprises transmitting information associated with a wireless communication link associated with the first wireless electronic device and the communication network.

25. A method as defined in claim 24, wherein disabling the sleep mode at the first wireless electronic device comprises disabling the sleep mode at the first wireless electronic device in response to receipt of one or more of a wake up call, message, or ping from the second wireless electronic device via a wireless communication link in accordance with a short-range wireless communication protocol.

* * * * *

UNITED STATES PATENT AND TRADEMARK OFFICE
CERTIFICATE OF CORRECTION

PATENT NO. : 7,349,355 B2  Page 1 of 2
APPLICATION NO. : 10/976946
DATED : March 25, 2008
INVENTOR(S) : Sengupta et al.

It is certified that error appears in the above-identified patent and that said Letters Patent is hereby corrected as shown below:

Column 13
Lines 3-10, "...detect...network to the first wireless electronic device; and wherein said receive is...network."
should read
--...detect...network to the first wireless electronic device; and transmit an alert to the first wireless electronic device from the second wireless electronic device; wherein said receive is...network.--.

Column 13
Line 12, "...the instruction..." should read --...the instructions are...--.

Column 13
Line 18, "...the instruction..." should read --...the instructions are...--.

Column 13
Line 25, "...the instruction..." should read --...the instructions are...--.

Column 13
Line 31, "...the instruction..." should read --...the instructions are...--.

Column 13
Line 40, "...the assemble..." should read --...the ensemble...--.

UNITED STATES PATENT AND TRADEMARK OFFICE
CERTIFICATE OF CORRECTION

| | |
|---|---|
| PATENT NO. | : 7,349,355 B2 |
| APPLICATION NO. | : 10/976946 |
| DATED | : March 25, 2008 |
| INVENTOR(S) | : Sengupta et al. |

It is certified that error appears in the above-identified patent and that said Letters Patent is hereby corrected as shown below:

Column 14
Lines 5-6, "...wherein the first and electronic devices, and..." should read --...wherein the first and second wireless electronic devices being associated with an ensemble of wireless electronic devices, and...--.

Signed and Sealed this

Twelfth Day of May, 2009

JOHN DOLL
*Acting Director of the United States Patent and Trademark Office*